C. F. STEWART.
BRACE FOR VEHICLE GEAR AND SHAFT HOUSINGS.
APPLICATION FILED JAN. 12, 1916.
1,205,284.
Patented Nov. 21, 1916.
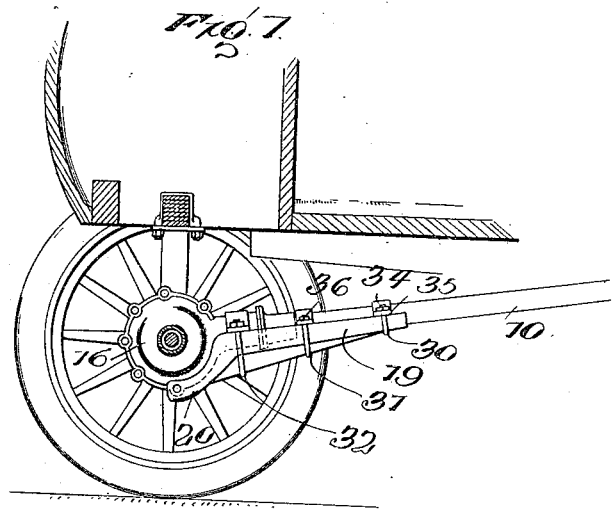
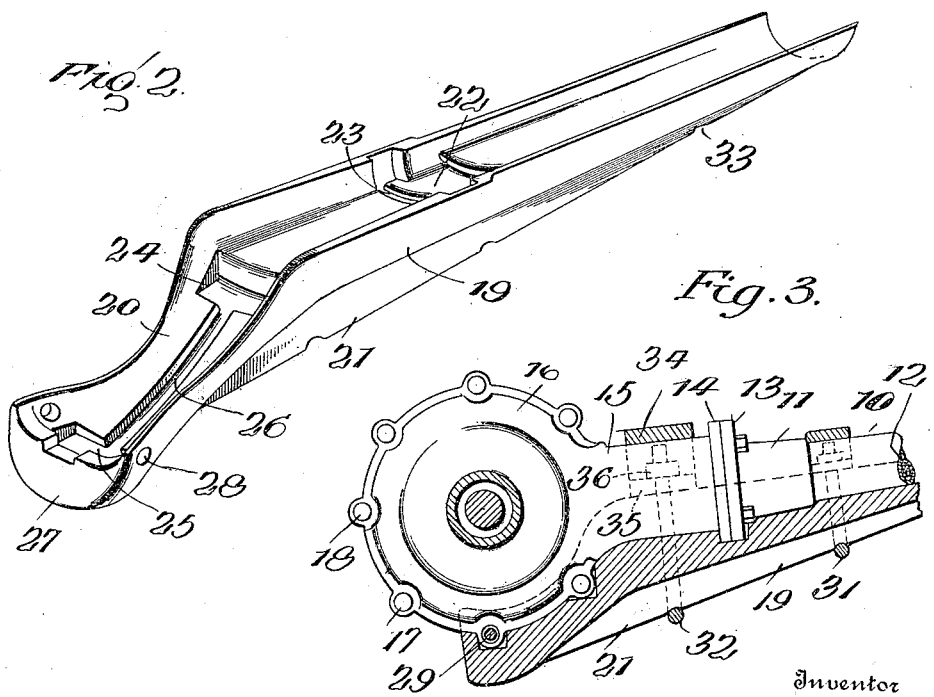
Inventor
C. F. Stewart
By
*[signature]*, Attorneys

UNITED STATES PATENT OFFICE.

CHARLES F. STEWART, OF NASHVILLE, KANSAS.

BRACE FOR VEHICLE GEAR AND SHAFT HOUSINGS.

1,205,284.  Specification of Letters Patent.  Patented Nov. 21, 1916.

Application filed January 12, 1916. Serial No. 71,709.

*To all whom it may concern:*

Be it known that I, CHARLES F. STEWART, a citizen of the United States, residing at Nashville, in the county of Kingman and State of Kansas, have invented certain new and useful Improvements in Braces for Vehicle Gear and Shaft Housings, of which the following is a specification.

My invention relates to new and useful improvements in supporting braces, the primary object of my invention being the provision of a brace applicable to the connected ends of the drive shaft and differential housings of a self-propelled vehicle to support and strengthen such joint and to hold the ends of the housings together in case of breaking of the joint.

More specifically, my invention comprehends a brace adapted to extend longitudinally along the lower face of the rear end of the drive shaft housing and along the lower face of the differential housing, being capable of connection to the latter housing by one of the bolts securing the housing sections together and being clamped at intervals to the drive shaft housing.

A further object of my invention consists in so constructing the above brace that it may be applied to vehicles as now in use without change and may be employed either to brace the joint to which it is applied to prevent its breaking or to support a joint already broken.

With these and other objects in view, my invention will be more fully described, illustrated in the accompanying drawings, and then specifically pointed out in the claims which are attached to and form a part of this application.

In the drawings: Figure 1 is a fragmentary sectional view through the rear axle of a conventional form of motor vehicle, showing my invention applied thereto. Fig. 2 is a perspective view of the brace; Fig. 3 is a fragmentary longitudinal sectional view of the brace, showing its manner of application to the joint between the housings.

Corresponding and like parts are referred to in the following description and indicated in all the views of the drawings by the same reference characters.

In order to insure a clear and accurate understanding of my invention and its use, it is first necessary to describe, in a general way, the construction and arrangement of the housings which it is to support and brace.

Referring more particularly to Figs. 1 and 2 of the drawings, it will be seen that I have shown my invention in connection with a drive shaft housing 10 having an enlargement 11 at its rear end forming the housing for the roller bearings for the drive shaft 12, this enlargement terminating in a clamping flange 13 for engagement with the clamping flange 14 of the tubular neck portion 15 of the differential housing 16. This differential housing is in two symmetrical parts having peripheral flanges provided with mating ears 17 through which are passed clamping bolts 18 to secure the housing sections together.

My invention comprises a supporting brace adapted to bear against the lower face of the rear portion of the drive shaft housing 10 and the differential housing 16 and includes a body 19 formed in a single piece and of any suitable metal, such as steel. This body, throughout the greater portion of its length, is concavo-convex in cross section, as clearly shown in Fig. 2 of the drawings, and at its rear end is provided with a downwardly directed extension 20 also concavo-convex in cross section. A web or flange 21 extends throughout substantially the entire length of the body along its lower face and medially thereof in such a manner that the body as a whole is widest at the point where its rear end begins to curve downwardly. This body, substantially midway of its length, has its upper or concave face recessed, as shown at 22, to seat the enlarged rear end 11 of the drive shaft housing 10 and further grooved or channeled, as shown at 23, to seat the flanges 13 and 14 and the bolts connecting them. The curvature of the rear end of the brace conforms to the curvature of the lower face of the differential housing 16 and this curved extension is provided with spaced recesses 24 and 25 to seat the ears 17 of the housing and with a longitudinal channel 26 connecting these recesses and also extending through the end 27 of the curved portion to seat the flanges carrying the ears 17. Because of this construction, it will be clear that my improved brace may be positioned against the lower faces of the shaft and differential housings to snugly engage such housings throughout its length. The rear end of the brace is provided at opposite sides with alined bolt receiving openings 28 and when the brace is applied, that bolt 18 passing through the ears, which seat in the recess 25, is removed and a longer but similar bolt 29 is passed through the openings 28 and through the ears 17 to not only assist in securing the sections of the housing 16 together, but also to secure the rear end of the brace to the housing. In addition to this, I provide spaced U-bolts 30, 31 and 32, the intermediate portions of which preferably seat in transverse notches 33 formed in the edge of the web 21 and the sides of which project above the side edges of the brace. U-shaped clamping plates 34 are provided to seat over the shaft housing 10 and the neck portion 15 of the differential housing 16 and have laterally directed peripheral ears 35 to receive the upwardly extending ends of the U-bolts. Nuts 36 are threaded upon the ends of the U-bolts to firmly clamp the housing in place. It will of course be understood that these U-bolts and clamping plates are so proportioned as to snugly engage about the housing sections and portions of the brace to which they are applied.

Although I have illustrated my invention in all its details of construction, it will of course be realized that I do not wish to limit myself to the specific arrangement of recesses and grooves shown as any changes which may be necessary to adapt it for different types of drive shaft and differential housings may be made which will fall within the scope of the appended claims.

Having thus described the invention, what is claimed as new is:

1. A brace for a joint connecting the differential and drive shaft housings of motor vehicles including a body adapted to engage against the lower face of such a joint and adjacent portions of the housings and having its upper face shaped to conform to the exterior surfaces of the housings against which it engages, and means for securing the body in place.

2. A brace for a joint connecting the differential and drive shaft housings of motor vehicles including a body adapted to engage against the lower face of such a joint and adjacent portions of the housings and having its upper face shaped to conform to the exterior surfaces of the housings against which it engages, and means for securing the body in place, said body throughout the greater portion of its length being provided with a longitudinal reinforcing web.

3. The combination with a differential housing and forwardly extending shaft housing connected to each other, of a brace adapted to engage against the lower faces of the housings and of the joint connecting them, and means for securing the brace in place.

4. The combination with a differential housing and forwardly extending shaft housing connected to each other, of a brace adapted to engage against the lower faces of the housings and of the joint connecting them, and means for securing the brace in place, said means including U-bolts embracing the brace, co-acting clamping plates partially embracing the housings and receiving the ends of the U-bolts, and clamping nuts threaded upon the bolts.

5. The combination with a drive shaft housing and two-part differential housing connected to the drive shaft housing and including sections having mating flanges through which extend bolts, of a brace member adapted to engage beneath the lower faces of the housings and joint connecting them and adapted at one end to seat the mating flanges of the differential housing, such end being formed with openings in alinement with one of the bolts of the differential housing, whereby such bolt may be passed through the member and housing, and additional means for securing the brace to the shaft housing.

6. The combination with a drive shaft housing and two-part differential housing connected to the drive shaft housing and including sections having mating flanges through which extend bolts, of a brace member adapted to engage beneath the lower faces of the housings and joint connecting them and adapted at one end to seat the mating flanges of the differential housing, such end being formed with openings in alinement with one of the bolts of the differential housing, whereby such bolt may be passed through the member and housing, and additional means for securing the brace to the shaft housing, said means including clamping members engaging about the shaft housing and brace.

7. The combination with a drive shaft housing and two-part differential housing connected to the drive shaft housing and including sections having mating flanges through which extend bolts, of a brace member adapted to engage beneath the lower faces of the housings and joint connecting them and adapted at one end to seat the mating flanges of the differential housing, such end being formed with openings in alinement with one of the bolts of the differential housing, whereby such bolts may be passed through the member and housing, and additional means for securing the brace to the shaft housing, said means including clamping members engaging about the shaft housing and brace, the brace being formed with a longitudinal reinforcing rib notched at intervals and the clamps seating in the notches.

In testimony whereof, I affix my signature.

CHARLES F. STEWART. [L. S.]

Copies of this patent may be obtained for five cents each, by addressing the "Commissioner of Patents, Washington, D. C."